United States Patent
Hong et al.

(10) Patent No.: US 7,118,821 B2
(45) Date of Patent: Oct. 10, 2006

(54) HYDROPHILIC POLYMER-OXIDE-PHOSPHORIC ACID COMPOSITIONS FOR PROTON CONDUCTING MEMBRANES

(75) Inventors: Wenbin Hong, Goleta, CA (US); Galen D. Stucky, Santa Barbara, CA (US); Ken Tasaki, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/083,067

(22) Filed: Mar. 16, 2005

(65) Prior Publication Data

US 2006/0148953 A1     Jul. 6, 2006

Related U.S. Application Data

(60) Provisional application No. 60/641,722, filed on Jan. 5, 2005, provisional application No. 60/656,604, filed on Feb. 24, 2005.

(51) Int. Cl.
*H01M 8/10*     (2006.01)

(52) U.S. Cl. .......... 429/33; 429/314; 429/316; 252/62.2

(58) Field of Classification Search .......... 429/33, 429/314, 316; 252/62.2
See application file for complete search history.

(56) References Cited

U.S. PATENT DOCUMENTS 6,878,475 B1 *   4/2005   Wixom et al. ............... 429/33

* cited by examiner

*Primary Examiner*—Robert D. Harlan
(74) *Attorney, Agent, or Firm*—James M. Ritchey

(57) ABSTRACT

An organic-inorganic hydrophilic polymer-oxide hybrid proton conducting membrane (PCM) is produced from a host organic polymer, a filler inorganic oxide, and a proton-source with a pKa less than about 5. Usually, the subject invention comprises PCMs containing host polymer-x-strong acid-y-filler oxide, wherein x is between about 1 and about 10 (with "x" as the molar ratio of acid anion to polymer repeat unit) and y≦about 50% (with "y" the weight percentage of filler oxide in the composite).

27 Claims, 7 Drawing Sheets

HYDROPHILIC POLYMER-OXIDE-PHOSPHORIC ACID COMPOSITIONS FOR PROTON CONDUCTING MEMBRANES

CROSS-REFERENCE TO RELATED APPLICATIONS

This application claims priority from U.S. Provisional application Ser. No. 60/641,722 filed on Jan. 5, 2005, incorporated herein by reference in its entirety.

This application also claims priority from U.S. Provisional application Ser. No. 60/656,604 filed on Feb. 24, 2005, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to novel proton conducting membranes (PCMs). Novel PCMs are disclosed that comprise a host polymer, one or more oxide fillers, and a strong acid ($pK_a$ less than about 5). More particularly, the subject invention comprises PCMs containing Polymer-x-strong acid-y-filler oxide and like composites, wherein x is between about 1 and about 10 (with x as the molar ratio of acid anion to polymer repeat unit) and y≦about 50% (with y the weight percentage of filler oxide in the composite). More particularly, the host polymer is PVP or equivalent polymer, the strong acid is phosphoric acid or an equivalent acid with a $pK_a$ less than about 5, and the filler oxide comprises $SiO_2$ or similar oxides.

2. Description of Related Art

Generally, the subject invention is utilized as a major component of a polymer electrolytic fuel cell (PEFC). PEFCs are generally comprised of three major components: the anode; the proton conducting membrane (PCM, the subject invention area); and the cathode. The PCM plays a critical role of transporting a proton from the anode to the cathode. It has to be highly proton conductive and also mechanically, thermally, and chemically stable. Water is produced at the interface between the cathode and the membrane. This water can be problematic, as discussed below, in operation of a PEFC. Lack of suitable membrane availability has been hindering the commercialization of PEFC. Water management is one of the most difficult issues in operating a PEFC. The water in the PEFC is produced as a product at the cathode side in PEFC. A breakdown in water balance between production and loss of water at the cathode side often results in water flood, while the anode interface with the membrane may suffer from water depletion due to water transportation toward the cathode side. Both the flood and the depletion may increase the cell over-potential which results in loss of power. Furthermore, the most commonly used PCMs are based on sulfonated perfluoropolymers that need to be fully humidified to be functional during the operation of the PEFC. Thus, these sulfonated perfluoropolymers not only require a humidifier, but also need an even distribution of water across the membrane which becomes an additional concern because of the membrane's high dependence on water.

Dry operation of PEFC may alleviate some of the water management problems. In fact, there is a strong demand in the auto industry as well as the distributed power generation industry for PEFC functional under low relative humidity (RH) (<50% RH)[Mathias, M.; Gasteiger, H.; Makharia, R.; Kocha, S.; Fuller, T.; Xie, T.; Pisco, J. *Preprints of Symposia-American Chemical Society, Division of Fuel Chemistry* 2004, 49(2), 471–474] Currently, no commercially available PCM meets this demand. NAFION, the industrial standard PCM by DuPont, is widely used in PEFC; yet it is sensitive to humidity, a very undesirable characteristic. Other existing proton conducting membranes, commercially available or under development, are as good or even better than NAFION under fully humidified condition, but very few outperform NAFION under low humidity conditions.

One existing PCM is disulfonated poly(arylene ether sulfone) copolymer (BPSH) developed by McGrath and coworkers[Wang, F.; Hickner, M.; Kim, Y. S.; Zawodzinski, T. A.; McGrath, J. E. *J. Membr. Sci.* 2002, 197, 231] Though BPSH is thermally stable and mechanically durable, and widely used as one of the most advanced alternative PCM, its proton conductivity under low RH (<80%) is lower than that of NAFION. Lack of membranes capable of functioning under low RH, (i.e., maintaining high conductivity, ~$10^{-1}$ Scm$^{-1}$) has been an obstacle to bringing PEFC to market. The challenge for the industry is how to improve the conductivity of PCMs, where water plays a vital role in proton transportation, under dry condition.

A typical approach previously attempted to improve the conductivity of PCMs under low RH has been to increase the degree of sulfonation in the PCM in an attempt to increase the overall conductivity. [Tchatchoua, C.; Harrison, W.; Einsla, B.; Sankir, M.; Kim, Y. S.; Pivovar, B.; McGrath, J. E., *Preprints of Symposia-Am. Chem. Soc., Div. of Fuel Chem.* 2004, 49(2), 601] The problem with such an approach is that the membrane tends to swell more with a higher degree of sulfonation, which is detrimental in operation of fuel cell since the dimensional stability of the PCM is a key to the operation. Also, there is synthetic difficulty associated with increasing degree of sulfonation. Furthermore, there is a theoretical limit to the conductivity due to the sulfonyl groups (—$SO_3H$) in the membrane.

An existing alternative approach to improve proton conductivity is a fabrication of composite membranes based on the conventional water-based PEM and inorganic/organic additives including $SiO_2$ and heteropolyacids (HPA). [Shao, Z.-G.; Joghee, P.; Hsing, I-M. *J. Membr. Sci.* 2004, 229, 43] Especially, HPA has been widely used to improve the performance of proton conducting membranes[Herring, A. M.; Turner, J. A.; Dec, S. F.; Sweikart, M. A.; Malers, J. L.; Meng, F.; Pern, J.; Horan, J.; Vernon, D. *Abst. 228th Am. Chem. Soc. National Meeting*, Philadelphia, Pa., Aug. 22–26, 2004 FUEL-053] The problems with HPA, however, are that it is water-soluble, thus leaches out, and the proton conductivity is sensitive to humidity. [Katsoulis, D. E. *Chem. Rev.* 1998, 98, 359] Hence, immobilization of HPA in a membrane is a particularly important issue. [Kim, Y. S.; Wang, F.; Hickner, M.; Zawodzinski, T. A.; McGrath, J. E. *J. Membr. Sci.* 2003, 212, 263]

An existing and more radical approach to improve proton conductivity is to replace water altogether. PCM with low volatile solvents such as imidazole have been utilized to replace water. [Kreuer, K. D.; Fuchs, A.; Ise, M.; Spaeth, Maier, M. J. *Electrochim. Acta* 1998, 43, 1281] Though the proton conductivity of $10^{-2}$ Scm$^{-1}$ has been achieved at high temperatures, imidazole is known to poison the Pt catalyst and also is subject to diffusing out of the membrane, which is currently fixed through chemical attachment to a host polymer. [Schuster, M. F. H.; Meyer, W. H.; Schuster, M.; Kreuer, K. D. *Chem. Mater.* 2004, 16, 329.] Also, work exists in which a polybenzimidazole membrane was doped by $H_3PO_4$ (PBI/$H_3PO_4$). [Fontanella, J. J.; Wintersgill, M. C.; Wainright, J. S.; Savinell, R. F.; Litt, M. *Electrochimica Acta* 1998, 43, 1289.] Yet, $H_3PO_4$ is known to be leached out by water on the cathode side. Improvement of the performance of a PBI/$H_3PO_4$ membrane has been achieved through the use of polyphosphoric acid, however, the poor performance at low temperature and leaching out of $H_3PO_4$ by water condensation remain unsolved. [Zhang, H.; Chen, R.; Ramanathan, L. S.; Scanlon, E.; Xiao, L.; Choe, E-W.; Benicewicz, B. C. *Prep. Div. Fuel Cehm. Am. Chem. Soc.*, Philadelphia, Pa., Aug. 22–26, 2004, 49, 588.] In another approach to replace water, inorganic solid acids such as $CsHSO_4$ have been used. [Haile, S. M.; Boysen, D. A.; Chisholm, C. R. I.; Merle, R. B. *Nature (London, United Kingdom)* 2001, 410, 910.] However, there are concerns regarding this solid acid: reduction of the sulfur in the $CsHSO_4$ electrolyte may occur over time, the reaction with hydrogen forms hydrogen sulfide, and also a poisoning to the Pt catalyst may occur. Other solid acids may be less problematic, but the stability of the materials remain problematic since the operation temperatures for these solid acids are close to their thermal decomposition temperatures. Thus, anhydrous (non-water) membranes have not reached a practical stage for operation of PEFC.

Additionally, four existing membrane works should be mentioned. The first concerns poly(vinylidene fluoride) (PVDF)-$H_3PO_4$-silica hybrid membranes. [Carriere, D.; Barboux, P.; Chaput, F.; Spalla, O.; Boilot, J. P. *Solid State Ionics* 2001, 145, 141] The hybrid membrane was prepared in a manner vaguely related to the subject invention (i.e., a polymer/$H_3PO_4$ blend is integrated in a silica network). The proton conductivity reported was $5\times10^{-3}$ Scm$^{-1}$ under 20% RH at 30° C. when 0.2 mols of $H_3PO_4$ was mixed for every repeating unit of PVDF. The conductivity found in that membrane is lower than the best performance of the subject invention (see Example 2 below), but the content of $H_3PO_4$ is lower than with the subject invention.

The second membrane work is by Honma et al., who have presented reports on hybrid membranes based on a silica network. [Honma, I.; Nomura, S.; Nakajima, H. *J. Membr. Sc.* 2001, 185, 83 and Honma, I.; Nakajima, H.; Nishikawa, O.; Sugimoto, T.; Nomura, S. *J. Electrochem. Soc.* 2003, 150, $A_{616}$] Their membranes were comprised of a polymer such as poly(ethylene oxide), poly(propylene oxide), and poly(tetramethylene oxide), 12-phosphotungstic acid, and $SiO_2$. It is critical that all of their membranes needed to be fully humidified to give high conductivity, $\sim10^{-2}$ Scm$^{-1}$, and lost conductivity under low humidity conditions.

The third previously reported membrane work is by Chen et al. who reported a blend membrane of PVP and PVDF which achieved the conductivity of 1 0–2 5 cm$^{-1}$ at room temperature, yet the membrane was fully humidified. [Chen, N.; Hong, L. *Solid State Ionics*, 2002, 146, 377]

Lastly, PVP has also been used as a PCM in combination with polyphosphoric acid. [Bozkurt, A.; Meyer, W. H. *J. Polym. Sci.* 2001, 39, 1987] However, the conductivities at room temperature and 120° C., $10^{-3}$ and $5\times10^{-3}$ Scm$^{-1}$, respectively, were both lower than the subject invention produced at room temperature.

It is noted and stressed that the subject approach is not to shun a way from water, the best medium for proton conduction, nor increasing the degree of sulfonation or using HPA. One of the host polymers, poly(vinyl pyrrolidone) (PVP), is very unique in that it has an amphipathic character (i.e., both hydrophilic and hydrophobic) due to the highly polar amide group and the carbonyl group for the hydrophilic portion and the non-polar hydrocarbon groups for the hydrophobic portion. It is known to form solid-state complexes with a wide variety of substances and the complexes are molecularly dispersed, suggesting this polymer is an ideal host polymer. [Carriere, D.; Barboux, P.; Chaput, F.; Spalla, O.; Boilot, J. P. *Solid State Ionics* 2001, 145, 141 and Honma, I.; Nomura, S.; Nakajima, H. *J. Membr. Sc.* 2001, 185, 83] Its high affinity toward acids, can accommodate a large amount of acid such as $H_3PO_4$ in the system and yet the acid is very tightly held in the interpenetrating network formed by the polymer, and associate oxide, such as $SiO_2$. This leads to a high proton conductivity of the membrane and also to very little loss of the acid out of the membrane. The subject system (with one preferred example having PVP/$H_3PO_4$/$SiO_2$ components, may vaguely resemble the PBI/$H_3PO_4$ system above. Yet, the subject system membrane is fundamentally and dramatically different in that it uses water, and also the acid, such as, but not limited to, $H_3PO_4$, for proton conduction, and thus maintains a high conductivity even at relatively low temperatures, <20° C., at which PBI/$H_3PO_4$ shows a poor performance. Furthermore, a fuel cell with the PBI/$H_3PO_4$ membrane needs to be maintained at high temperatures, >160° C., at which new concerns arise such as corrosion of the electrode. In other words, the subject invention allows for fuel cell operation at moderately low and high temperatures without external humidification and without presenting the problems associated with the currently available alternative PCMs. Further, it is stressed that the subject invention utilizes the filler oxide (e.g. $SiO_2$) to form an interpenetrating network which is one of the fundamental differences from the PBI/$H_3PO_4$ system, in addition to using $H_2O$. In the PBI/$H_3PO_4$ system, $H_3PO_4$ is also trapped in the network. Furthermore, the subject invention PVP-$H_3PO_4$—$SiO_2$ even functions at subzero temperatures, which is another advantage over the PBI/$H_3PO_4$ system.

It is recorded that $SiO_2$ has been used previously by mixing its particles in a PCM. [Shao, Z-G.; Joghee, P.; Hsing, I-M. *J. Membr. Sci.* 2004, 229, 43] However, the subject invention uses oxides, such as $SiO_2$, to form a interpenetrating network in the membrane. This network not only enhances the mechanical property of the membrane, but also traps the selected acid, such as $H_3PO_4$, to avoid leaching out of the acid.

The subject hybrid membrane has higher conductivity than the prior arts. This is because the subject membrane has a different host polymer, PVP, which is a more desirable host polymer for $H_3PO_4$ due to PVP's extreme high affinity to the acid, thus having a higher uptake of $H_3PO_4$, leading to a higher conductivity even under low humidity. Also, it forms a very transparent, well dispersed membrane with very few pores.

In relation to Chen et al. [Chen, N.; Hong, L. *Solid State Ionics*, 2002, 146, 377], the subject invention uses $H_3PO_4$ as an extra proton carrier to facilitate the proton conduction and $H_3PO_4$ is imbedded in the silica network.

Hence, in the subject invention the host polymer, such as PVP, has a strong interaction with the selected acid, such as $H_3PO_4$, thus having a large intake of the acid. The acid is immobilized in the interpenetrating network formed by condensation of silica in the membrane to avoid leaching out. The membrane is flexible, transparent, and ductile. Because of a large amount of acid, such as $H_3PO_4$, already imbedded in the membrane, a small amount of water can significantly facilitates the proton conduction, thus leading to a high conductivity under a low humidity. The conduction mechanism is a proton being transferred between acid molecules or between an acid molecule and a water molecule or between water molecules in a combination of a Grotthus-type mechanism (i.e., the protons are transferred within adjacent hydrogen bonds) and a vehicular mechanism.

An approach to produce an effective PCM is based on organic-inorganic materials generated by sol-gel and has recently gained increasing interest in view of obtaining new composite compounds with unique properties that result from intimate mixing of various components on a molecular level. In the sol-gel process organic groups are introduced by co-condensation of alkoxides (of silicon, aluminum, titanium, zirconium, tin, etc.) with reactive organic functionalities followed by organic cross-linking reactions, thus providing the advantages of the polymers, while the inorganic network gives an amorphous structure and good thermal, mechanical and chemical stability. Some of the membranes investigated so far are: 1) NAFION/alkoxide composite membranes, such as, NAFION/$SiO_2$—$P_2O_5$—$ZrO_2$ [M. Aparicio, F. Damay, L. C. Klein, "Characterization of SiO2-P2O5-ZrO2 sol-gel/NAFION composite membranes", *Journal of Sol-Gel Science and Technology*, 26(1/2/3) (2003), p. 1055–1059 and Aparicio, M.; Klein, L. C.; Adjemian, K. T.; Bocarsly, A. B., "SiO2-P2O5-ZrO2 sol-gel/NAFION composite membranes for PEMFC", *Ceramic Transactions*, 127 (2002), p. 167–176], NAFION/silicon oxide [Jung, D. H.; Cho, S. Y.; Peck, D. H.; Shin, D. R.; Kim, J. S., "Performance evaluation of a Nafion/silicon oxide hybrid membrane for direct methanol fuel cell", *Journal of Power Sources*, 106 (2002), p. 173–177 and Kim, Haekyoung; Lim, C.; Chang, H., "Fabrications and direct methanol fuel cell applications of Nafion based organic-inorganic hybrid membrane", *Proceedings-Electrochemical Society* (2001), 2001–4(Direct Methanol Fuel Cells), p14–28], NAFION/glass [Nogami, M.; Usui, Y.; Kasuga, T., "Proton conducting organic-glass composites", *Fuel Cells*, 1 (2001), p. 181–185], NAFION/silica [Miyake, N.; Wainright, J. S.; Savinell, R. F., "Evaluation of a sol-gel derived Nafion/silica hybrid membrane for polymer electrolyte membrane fuel cell applications 11. Methanol uptake and methanol permeability", *Journal of the Electrochemical Society*, 148 (2001), A905–A909 and Miyake, N.; Wainright, J. S.; Savinell, R. F., "Evaluation of a sol-gel derived Nafion/silica hybrid membrane for proton electrolyte membrane fuel cell applications 1. Proton conductivity and water content", *Journal of the Electrochemical Society*, 148 (2001), A898–A904], NAFION/$TiO_2$ [Uchida, Hiroyuki; Ueno, Yoshihiko; Hagihara, Hiroki; Watanabe, Masahiro, "Self-humidifying electrolyte membranes for fuel cells", *Journal of the Electrochemical Society*, 150 (2003), A57–A62], NAFION/$Cs^+$ ions [V. Tricoli, "Proton and methanol transport in poly(perfluorosulfonate) membranes containing $Cs^+$ and $H^+$ cations", *J. Electrochem. Soc.* 145 (1998), p. 3798–3801], and NAFION/alkoxides of Ti, Al, Zr and organoalkoxysilanes [V. Tricoli, "Proton and methanol transport in poly(perfluorosulfonate) membranes containing $Cs^+$ and $H^+$ cations", *J. Electrochem. Soc.* 145 (1998), p. 3798–3801]. It was found that the incorporation of inorganic phase in NAFION led to improvements in its thermal stability, reduction of methanol crossover, and higher performance at elevated temperature. However, the proton conductivity in the hybrid membrane was lower than, or equal to, that in unmodified NAFION membranes if the inorganic phase was not $P_2O_5$ [M. Aparicio, F. Damay, L. C. Klein, "Characterization of SiO2-P2O5-ZrO2 sol-gel/NAFION composite membranes", *Journal of Sol-Gel Science and Technology*, 26(1/2/3) (2003), p. 1055–1059, Nogami, M.; Usui, Y.; Kasuga, T., "Proton conducting organic-glass composites", *Fuel Cells*, 1 (2001), p. 181–185, and Miyake, N.; Wainright, J. S.; Savinell, R. F., "Evaluation of a sol-gel derived Nafion/silica hybrid membrane for proton electrolyte membrane fuel cell applications 1. Proton conductivity and water content", *Journal of the Electrochemical Society*, 148 (2001), A898–A904], which favored proton migration based on the Grotthus-type mechanism [T. Yajima and H. Iwahara H. Uchida, "Protonic and oxide ionic conduction in BaCeO3-based ceramics—effect of partial substitution for Ba in $BaCe_{0.9}O_3$— with Ca", *Solid State Ionics*, 47 (1991), p. 117–124, N. Bonanos, B. Ellis, K. S. Knight and M. N. Mahmood, "Ionic conductivity of gadolinium-doped barium cerate perovskites", *Solid State Ionics*, 35 (1989), p. 179–188, and H. Iwahara, H. Uchida, K. Morimoto, "High temperature solid electrolyte fuel cells using perovskite-type oxide based on barium cerium oxide ($BaCeO_3$)", *J. Electrochem. Soc.*, 137 (1990), p. 462–465]. The studies suggested that inorganic network led to increased close "channel" in film formation, thus decreased the ionic conductivity. 2) Polymer/heteropolyacid composite membranes [Chu, Young-Hwan; Lim, Jung-Eun; Kim, Hyun-Jong; Lee, Chang-Ha; Han, Hak-Soo; Shul, Yong-Gun, "Proton conducting silica mesoporous/heteropolyacid-PVA/SSA nano-composite membrane for polymer electrolyte membrane fuel cell", *Studies in Surface Science and Catalysis*, 146 (2003), (Nanotechnology in Mesostructured Materials), p. 787–790, Honma, I.; Nakajima, H.; Nishikawa, O.; Sugimoto, T.; Nomura, S., "Family of High-Temperature Polymer-Electrolyte Membranes Synthesized from Amphiphilic Nanostructured Macromolecules", *Journal of the Electrochemical Society*, 150 (2003), A616–A619, Honma, Itaru; Nakajima, Hitoshi; Nishikawa, Osamu; Sugimoto, Toshiya; Nomura, Shigeki, "Proton conducting electrolyte membranes synthesized through amphiphilic organic/inorganic hybrid macromolecules", *Electrochemistry* (Tokyo, Japan), 70 (2002), p. 920–923, Honma, Itaru; Nakajima, Hitoshi; Nomura, Shigeki, "High temperature proton conducting hybrid polymer electrolyte membranes", *Solid State Ionics*, 154–155 (2002), p. 707–712, Honma, I.; Nakajima, H.; Nishikawa, O.; Sugimoto, T.; Nomura, S., "Amphiphilic organic/inorganic nanohybrid macromolecules for intermediate-temperature proton conducting electrolyte membranes", *Journal of the Electrochemical Society*, 149 (2002), A1389–A1392, Honma, I.; Nishikawa, O.; Sugimoto, T.; Nomura, S.; Nakajima, H., "A sol-gel derived organic/inorganic hybrid membrane for intermediate temperature PEFC", *Fuel Cells,* 2(1) (2002), p. 52–58, Nakajima, Hitoshi; Honma, Itaru, "Proton-conducting hybrid solid electrolytes for intermediate temperature fuel cells", *Solid State Ionics,* 148(3,4) (2002), p. 607–610, Lavrencic Stangar, U.; Groselj, N.; Orel, B.; Schmitz, A.; Colomban, Ph., "Proton-conducting sol-gel hybrids containing heteropoly acids", *Solid State Ionics,* 145(1–4) (2001), p. 109–118, and Honma, I.; Takeda, Y.; Bae, J. M., "Protonic conducting properties of sol-gel derived organic/inorganic nanocomposite membranes doped with acidic functional molecules", *Solid State Ionics,* 120(1–4) (1999), p. 255–264]. By doping heteropolyacid like 12-phosphotungstic acid (PWA) into the network and through sol-gel processing of bridged polysilsesquioxanes, amphiphilic organic/inorganic nano-hybrid membranes were synthesized. The membranes show large proton conductivity at intermediate temperature up to 140° C. and flexible as well as thermally stable due to the temperature tolerant inorganic frameworks. 3) Other organic/inorganic hybrids, such as, PVA/silica [Kim, Dae Sik; Shin, Kwang Ho; Park, Ho Bum; Rhim, Ji Won; Lee, Young Moo., "PVA/silica hybrid membrane containing sulfonic acid group for direct methanol fuel cells application", *Membrane,* 13(2) (2003), p. 101–109], polyethylene glycol/$SiO_2$ [Chang, H. Y.; Lin, C. W., "Proton conducting membranes based on PEG/SiO2 nanocomposites for direct methanol fuel cells", *Journal of Membrane Science,* 218(1–2) (2003), p295–306 and Honma, I.; Hirakawa, S.; Yamada, K.; Bae, J. M., "Synthesis of organic/inorganic nanocomposites protonic conducting membrane through sol-gel processes", *Solid State Ionics,* 118(1,2) (1999), p. 29–36], 3-glycidoxypropyltrimethoxy-silane/$P_2O_5$ [Tadanaga, Kiyoharu; Yoshida, Hiroshi; Matsuda, Atsunori; Minami, Tsutomu; Tatsumisago, Masahiro, "Proton conductive inorganic-organic hybrid membranes as an electrolyte for fuel cells prepared from 3-glycidoxypropyltrimethoxysilane and orthophosphoric acid", *Electrochemistry* (Tokyo, Japan), 70(12) (2002), p. 998–1000], perfluorosulfonic acid/$SiO_2$ [Adjemian, K. T.; Srinivasan, S.; Benziger, J.; Bocarsly, A. B., "Investigation of PEMFC operation above 100° C. employing perfluorosulfonic acid-silicon oxide composite membranes", *Journal of Power Sources,* 109(2) (2002), p. 356–364], and polypropylene glycol/$SiO_2$ [Honma, I.; Nomura, S.; Nakajima, H., "Protonic conducting organic/inorganic nanocomposites for polymer electrolyte membrane", Journal of Membrane Science, 185(1) (2001), p. 83–94]. In general the composite membranes have higher mechanical and thermal stabilities and are more robust than the control membranes (unmodified membranes), which degrade after high operation temperature and thermal cycling. However, the ionic conductivity of the membranes is very dependent on the content of sulfonic acid group that works as a donor of hydrophilic $SO_3H$ group.

BRIEF SUMMARY OF THE INVENTION

An object of the present invention is to describe a PCM having proton conducting capabilities for fuel cells, without external humidification and for a wide range of operation temperatures.

Another object of the present invention is to present a PCM that functions in virtually any relative humidity range and up to about 200° C.

An additional object of the present invention is to relate a PCM comprising a host polymer, one or more filler oxides, and an acid with a $pK_a$ less than about 5.

A still further object of the present invention is to disclose a PCM produced by combining a host polymer, filler $SiO_2$, and phosphoric acid.

Generally, the subject invention comprises a PCM having a host polymer such as PVP, an oxide component such as $SiO_2$, and a strong proton-source agent such as $H_3PO_4$. Usually, the subject invention comprises a host polymer combined with "x" amount of acid and "y" amount of oxide and like composites, wherein x is between about 1 and about 10 (with "x" as the molar ratio of acid anion to polymer repeat unit) and y≦about 50% (with "y" the weight percentage of oxide in the composite).

Further objects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
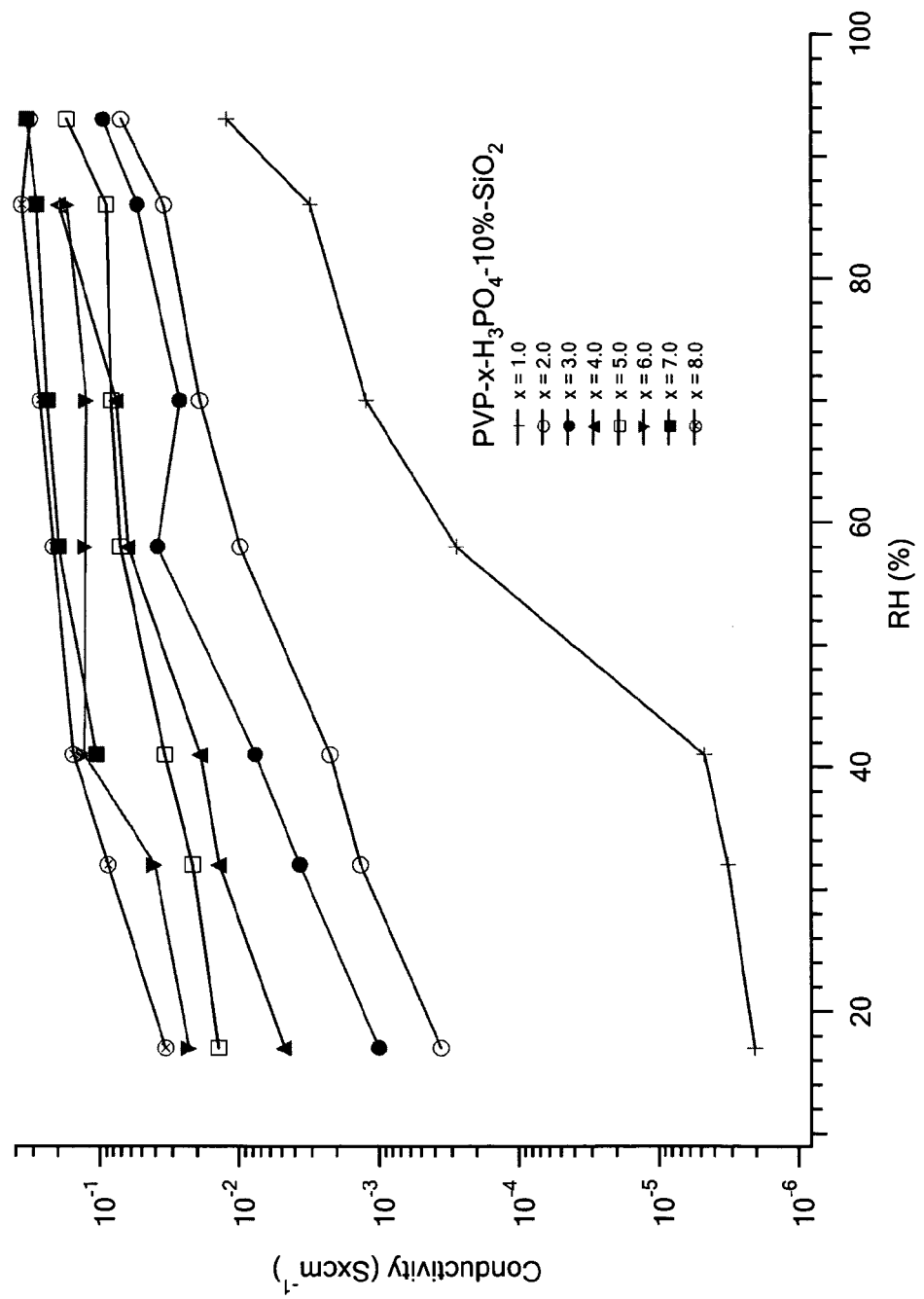
FIG. 1 shows the proton-conductivity for PVP-x-$H_3PO_4$-10%-$SiO_2$ hybrid membranes as a function of relative humidity (RH).

Referring more specifically to FIGS. 1 to 7, for illustrative purposes the present invention is embodied in novel proton conducting membranes (PCMs) produced from various suitable combinations of the chemical structures described in detail below. It will be appreciated that the PCMs may vary as to their exact component percentages, without departing from the basic concepts as disclosed herein.

Generally, the subject invention comprises PCMs produced from combining a host polymer, one of more filler oxides, and an acid with a $pK_a$ less than about 5. Organic-inorganic hydrophobic polymer-silica hybrids doped with proton conducting acid (e.g. $H_3PO_4$ and the like) were prepared using a sol-gel process. Host Polymer-x-Acid-y-Filler Oxide composites were produced and found to function effectively as PCMs.

Specifically, the subject invention comprises Polymer-x-Acid-y-Oxide and like composites, wherein x is between about 1 to about 10 (with x as the molar ratio of acid anion to polymer repeat unit) and y≦about 50% (with y the weight percentage of oxide in the composite). More specifically, the subject invention comprises Polymer-x-$H_3PO_4$-y-$SiO_2$ and like composites, wherein x is between about 1 to about 10

(with x as the molar ratio of $PO_4^{3-}$ to polymer repeat unit) and y≦about 50% (with y the weight percentage of $SiO_2$ in the composite). TGA data showed that the composites were thermally stable up to approximately 200° C. The glass transition temperature of the composites dropped from about 176° C. to about −46° C. when x was changed from 0 to 6. This film FTIR and 13C, 29Si, and 31P NMR studies revealed that in addition to the hydrogen bonding between the hydrophobic groups of the polymer and the phosphoric acid, the silanol groups reacted with the $PO_4^{3-}$ groups as well, which suggests a semi-IPN structure of the composites. The proton conductivities of the composites increased with acid content and relative humidity (R.H.). At high acid content (x≧3), the composites had higher conductivity than NAFION at low R.H. and comparable conductivities to NAFION at high R.H. (>60%). Therefore, the composites show great potential for use in intermediate temperature fuel cells.

HOST POLYMER—The host polymers of this invention include, but are not limited to, poly(vinyl pyrrolidone) (PVP), polyethyleneimine (PEI), poly(4-vinyl pyridine) (P4VP), poly(imides), poly(benzimidazole), poly(vinylimidazole), poly(imino[methylphosphinylidene]iminomethylene-1,3-phenylenemethylene), poly(amides) and other equivalent compounds including species that contain proton accepting sites such as a nitrogen atom or/and a carboxyl group and are thermally, chemically, and mechanically stable, and durable when mixed with the other subject compounds under typical fuel cell operation conditions.

The host polymers in this proposal are chosen from basic polymers, porous polymers, hybrid copolymers, polymer gels and hydrogels, as an attempt to achieve distinct morphologies to optimize their respective proton conductivity. The above mentioned basic polymer types are excellent host materials for strong acids, which act as proton sources at high temperature conduction. For the porous polymers, if the pores are functionalized with hydroxyl groups, due to their unique porous microstructure the density of the hydroxyl groups on the pore surfaces is increased. This helps to retain water at elevated temperature, and as the result, the number of proton carriers, is raised. The hybrid copolymers contain a hydrophobic part and a hydrophilic part, resulting in NAFION-like microphase separation due to the immiscibility of the two parts. The conduction of hydrated proton is enhanced within the hydrophilic channels. The polymer gels and hydrogels have advantages on water absorption over other polymers. A composite structure is proposed to enhance their low mechanical properties and thermal stability for the purpose of application up to 150° C.

FILLER OXIDES—Filler oxides are utilized to enhance proton conduction and water uptake at elevated temperature and dry conditions. The filler oxides employed in the subject invention include, but are not limited to, separate or combined quantities of $SiO_2$, $Al_2O_3$, $TiO_2$, and equivalent materials, including nanoparticles or other functional physical states. For nanoparticles, the hydrogen bonding between the nanoparticle surface and water molecules helps to retain water above its boiling temperature. Because the nanoparticle groups are stable up to about 300° C., the nanoparticles are promising fillers.

The PCM materials are produced by adding the filler oxides into the host materials using a variety of processes, such as, mixing, shear mixing, mesoporous substrate supporting, sol-gel, and like methods. The polymer backbone can be homopolymer, linear copolymer, grafted branch copolymer, and the architecture can be IPN, semi-IPN and non-IPN, depending on the process applied.

ACID SOUCE/PROTON-SOURCE AGENT—The acids utilized for the subject invention have $pK_a$ values of less than about 5 and include, but are not limited to, $H_3PO_4$, $H_3PO_3$, $H_2SO_4$, $CF_3SO_3H$, HPA, and imides and equivalent materials. Contrary to existing PCMs that derive their acidity from weaker acid species like the $SO_3H$ group, a typical acid group found on traditional PCMs ($pK_a$ of $C_6H_5SO_3H$ is approximately 2), the subject proton-source agents utilize stronger acids in combination with appropriate oxides. Strong acids result in higher concentrations of protons, the ion carrier in PCM, in general, due to the higher proton dissociation of the acid; thus, the subject acids increase overall conductivity of a PCM, lifting conductivity versus relative humidity (RH). Stronger acids can also hold more so-called "bound water" which may be used for proton transportation, especially beneficial under low RH. The importance of bound water in a PCM has been recognized. [Kim, Y. S.; Dong, L.; Hickner, M. A.; Glass, T. E.; Webb, V.; McGrath, J. E. *Macromolecules* 2003, 36, 6281.] This may decrease the slope of found in traditional conductivity vs. RH curves, which lifts the conductivity under low RH relative to that under higher RH.

Examples

Example 1

Synthesis of PVP-$H_3PO_4$-Silica-Hybrid Composites

The subject membrane (or hybrid membrane) was prepared in three steps. PVP (200 mg, MW=630 k) was firstly dissolved in 5 mL of methanol. Normally a transparent solution was obtained. If gelation happened, it was discarded. Similarly, a calculated amount of phosphoric acid crystal was dissolved in another 5 mL of methanol. Silica sol was prepared by mixing tetraethoxysilane (TEOS), ethanol, $H_2O$, and HCl in a molar ratio of 1:4:0.01:8. The sol was kept at room temperature for approximately 6 hrs so that TEOS was hydrolyzed. In the second step, phosphoric acid solution was added to the PVP solution. The mixture was allowed to stand for approximately 1 hr to promote the reaction between PVP and phosphoric acid. To form the IPN structure of the hybrid, silica sol was added to the mixture under vigorous stirring. The new mixture was kept at room temperature for about 1 hr and was cast into membranes in TEFLON molds. Finally, the membrane was dried at 75° C. overnight in a nitrogen atmosphere, and was further dried at 80° C. for 3 days in vacuum.

These subject hybrids were denoted as PVP-x-$H_3PO_4$-y-$SiO_2$, where "x" is the molar ratio of $H_3PO_4$ to the repeat unit of monomer and "y" is the weight percentage of $SiO_2$ in the hybrids. Therefore, PVP-1.0-$H_3PO_4$-10%-$SiO_2$ stands for 1.0 mole of $H_3PO_4$ in 1.0 mole of repeat monomer and total weight of $SiO_2$ is 10%.

Example 2

Proton Conductivity of the Hybrid Membranes

The proton conductivities of the membranes were measured using an HP impedance analyzer at room temperature as a function of humidity. The experimental results are shown in FIGS. 1–5. In FIG. 1, the proton conductivity of PVP-x-$H_3PO_4$-10%-$SiO_2$ membranes increases with $H_3PO_4$ content and relativity humidity. It can be found that at lower phosphoric acid loading (x=1.0~3.0), the proton conductivity is humidity sensitive. For example, in x=1.0, when humidity increases from 17% to 93%, the conductivity increases from $2\times10^{-6}$ to 0.01, a magnitude of $10^4$. At a higher acid content (x=4.0~6.0), although conductivity still increases with acid loading, the increase is very limited. For example, the conductivity of the x=6.0 sample at 17% RH is 0.02 while at 93% it is 0.19. This results suggest that the hybrids with x>3.0 acid content are proper choices for proton conduction at elevated temperature, especially at 120~150° C. where the membrane works in a dry condition.

Figure 2:
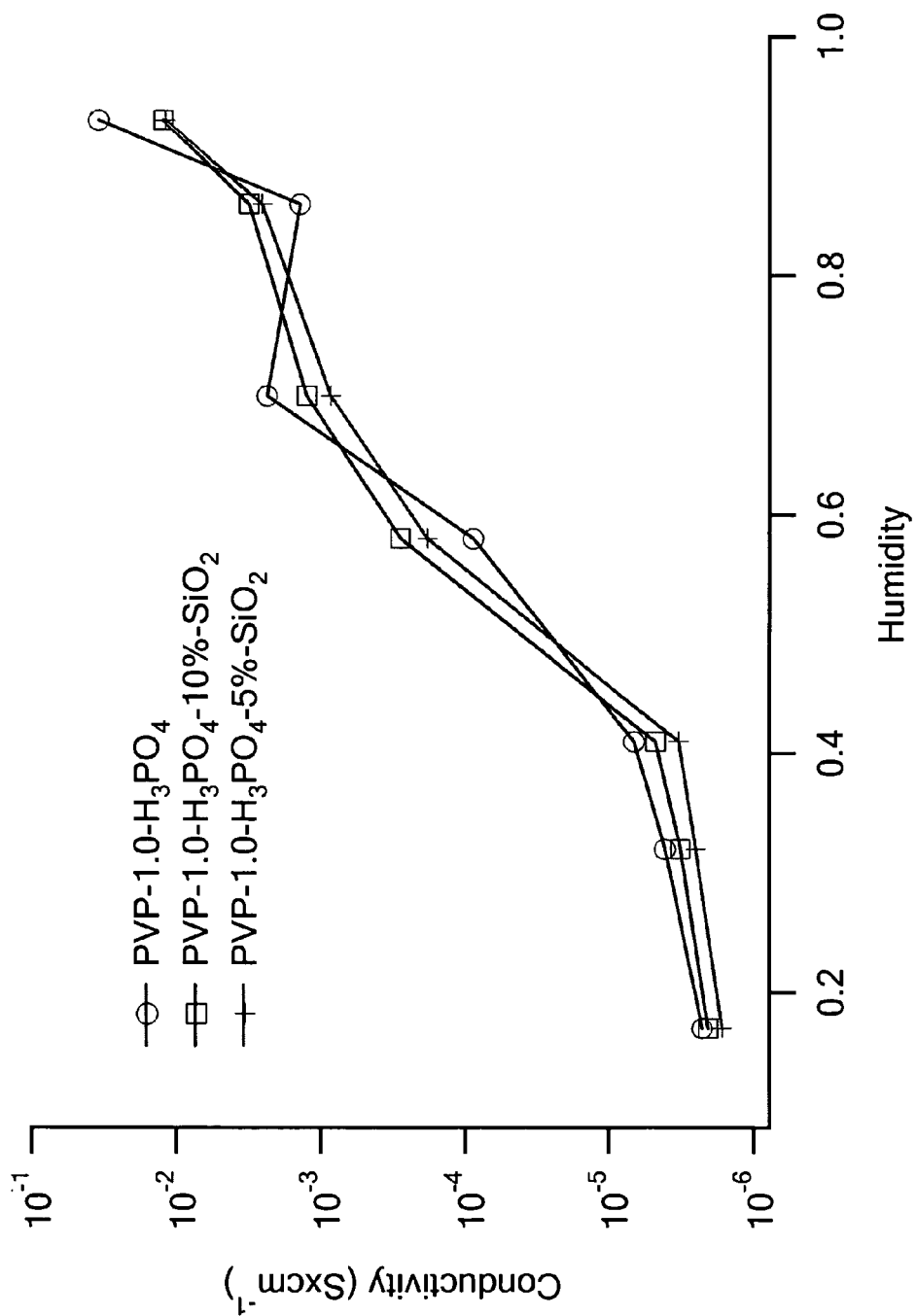
FIG. 2 shows the proton-conductivity of PVP-1.0-$H_3PO_4$ hybrid membranes with different $SiO_2$ content.

For a comparison study, FIG. 2 shows the conductivity of PVP-1.0-$H_3PO_4$ with different $SiO_2$ content. It is interesting to find that the effect of $SiO_2$ on proton conductivity is limited. A possible explanation is the silica network is well interpenetrated with the PVP chain, so that particle aggregation is inhibited and the proton conductivity is controlled by the polymer channel. However, because the morphology study is still in progress, this assumption is not evidenced yet.

Figure 3:
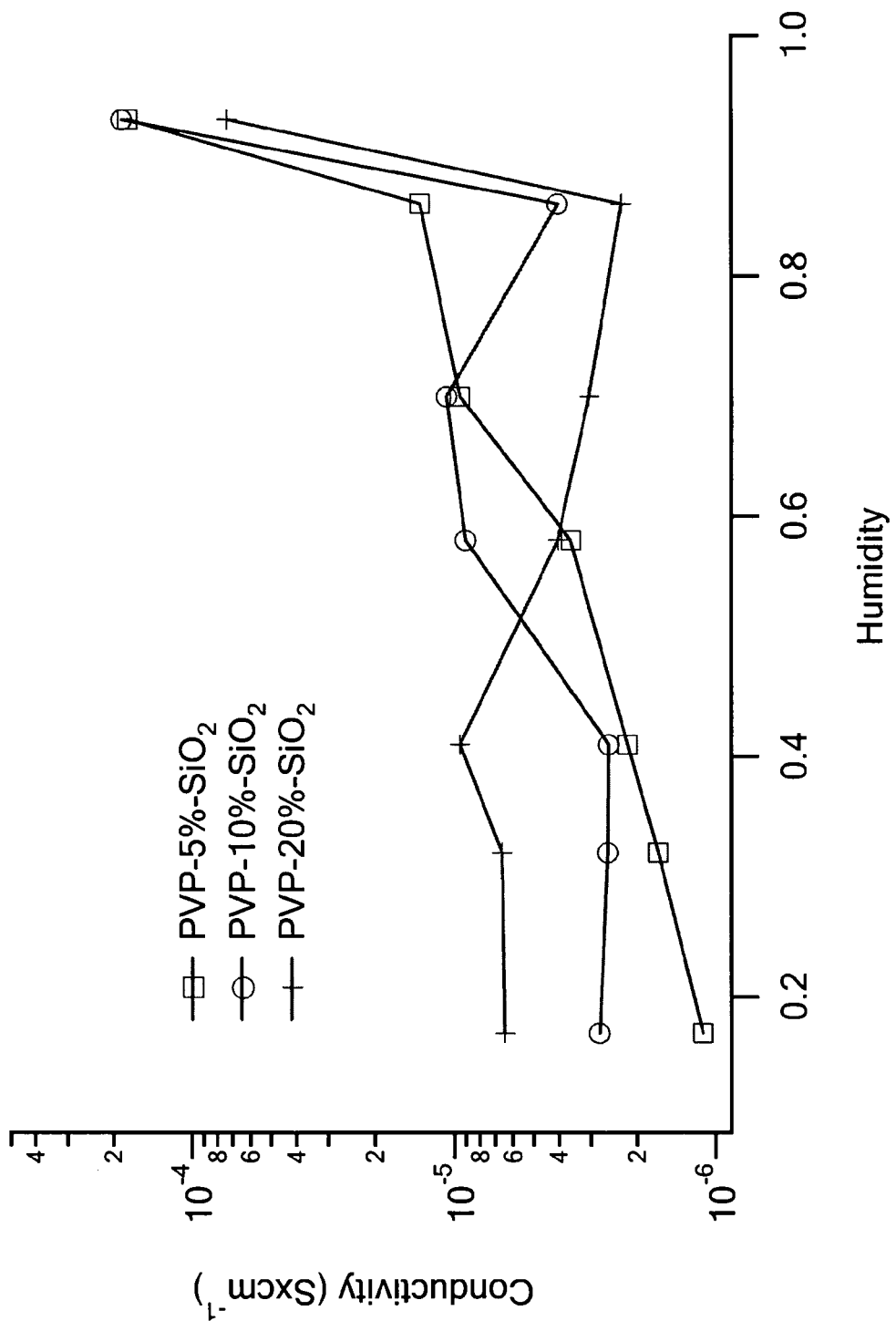
FIG. 3 shows the proton-conductivity of PVP-$SiO_2$ with various $SiO_2$ content, but no proton-source.

FIG. 3 shows the conductivity of the PVP-$SiO_2$ hybrid. Due to the lack of proton source, the conductivity of the hybrid is poor ($10^{-5}$~$10^{-4}$). It is an expected behavior and it provides some evidence on the limited effect of $SiO_2$ on proton conductivity.

Figure 4:
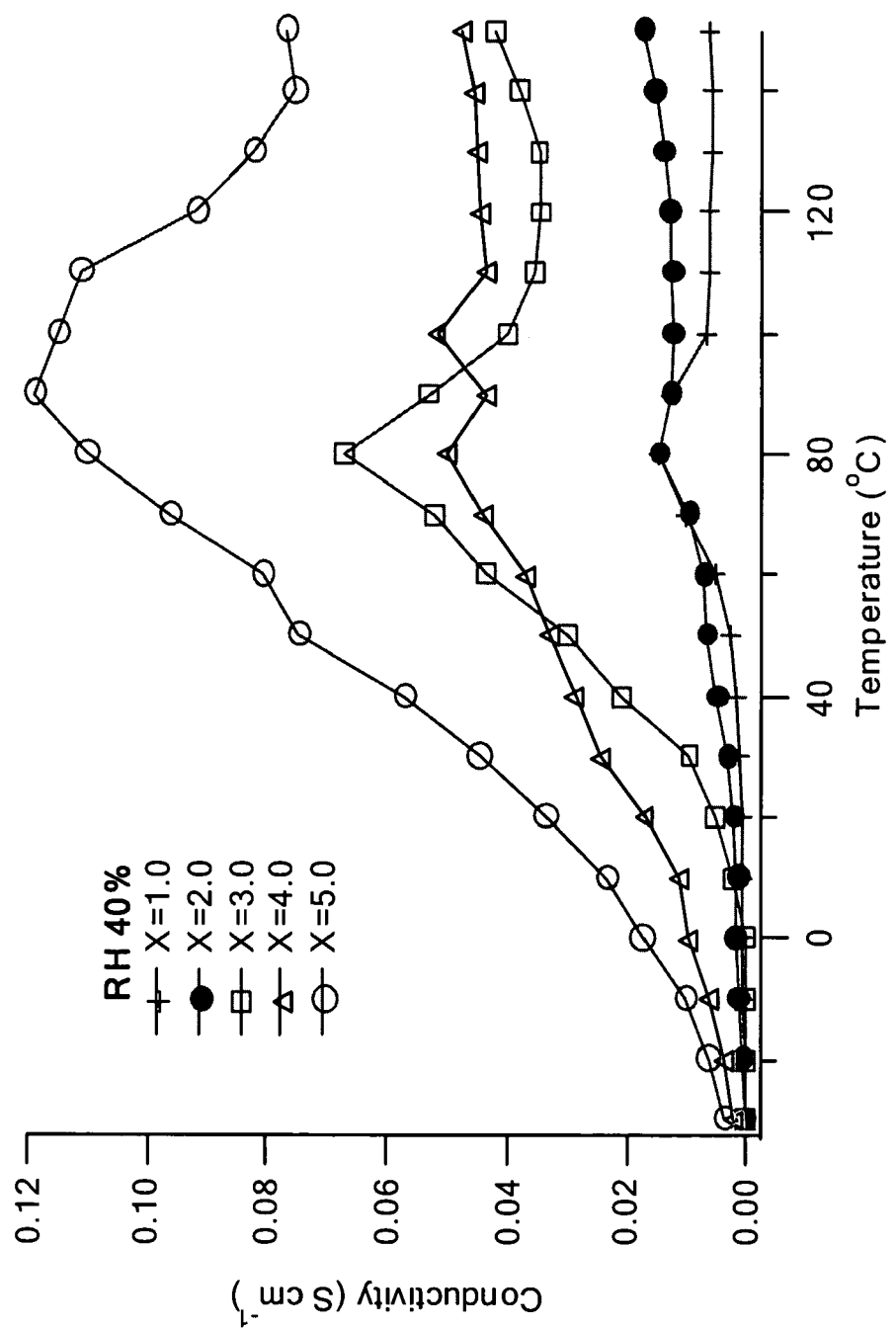
FIG. 4 shows proton conductivities of PVP-x-$H_3PO_4$-10%-$SiO_2$ hybrid membranes as a function of temperature under low humidity conditions (RH=40%).
Figure 5:
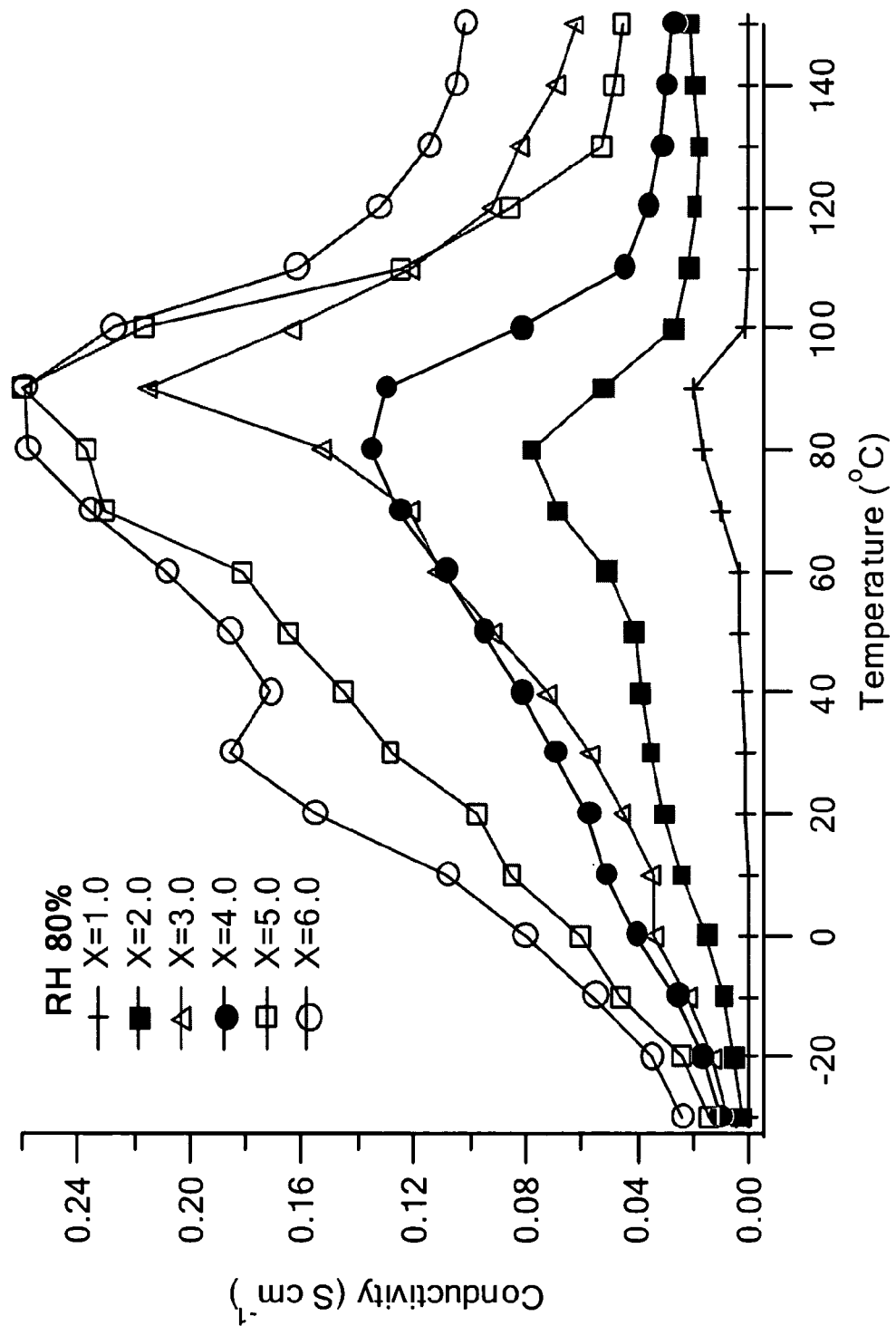
FIG. 5 shows proton conductivities of PVP-x-$H_3PO_4$-10%-$SiO_2$ hybrid membranes as a function of temperature under high humidity conditions (RH=80%).

In FIGS. 4 and 5, proton conductivities of PVP-x-$H_3PO_4$-10%-$SiO_2$ membranes are shown as a function of temperature under low humidity conditions (RH=40% in FIG. 4) and under high humidity conditions (RH=80% in FIG. 5). As is clearly illustrated, proton conductivity generally increases as "x" increases.

Example 3

Thermal Properties of the Hybrids

Figure 6:
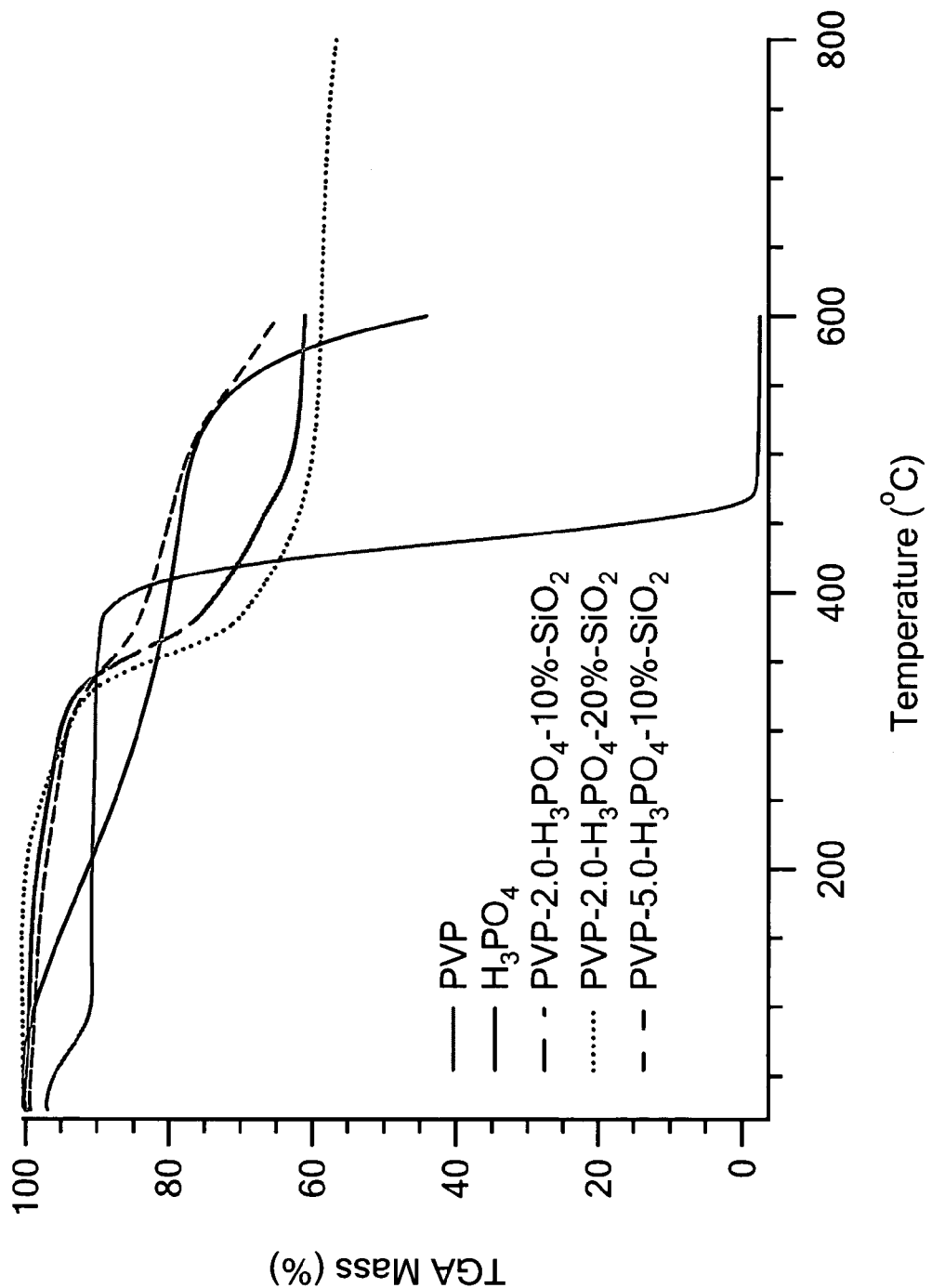
FIG. 6 shows the TGA curves for PVP, $H_3PO_4$, and various subject hybrid membranes.

The thermal stability and glass transition of the membranes were studied using TGA and DSC in a $N_2$ atmosphere. FIG. 6 shows the TGA curves of PVP, $H_3PO_4$ and some hybrids. It can be found that PVP is thermally stable up to 400° C. Phosphoric acid, however, starts to lose weight from 50° C. Because it is very hygroscopic, the weight lost below 100° C. is believed to cause by the release of water adsorbed in sample preparation. In about 200° C., phosphoric acid cross-links to form polyphosphoric acid, and keeps stable to 550° C., above which the material decomposes and has significant weight lost. The hybrid materials have a decomposition temperature at about 200° C., which is between that of PVP and phosphoric acid. It is interesting that the content of phosphoric acid has limited effect on the decomposition temperature. A possible reason is that phosphoric acid reacts with polymer and silica thoroughly and the material is well interpenetrated so that decomposition is determined by the chain interactions of the polymers. This finding suggests that doping higher content of phosphoric acid (i.e., x>8.0) is possible.

Figure 7:
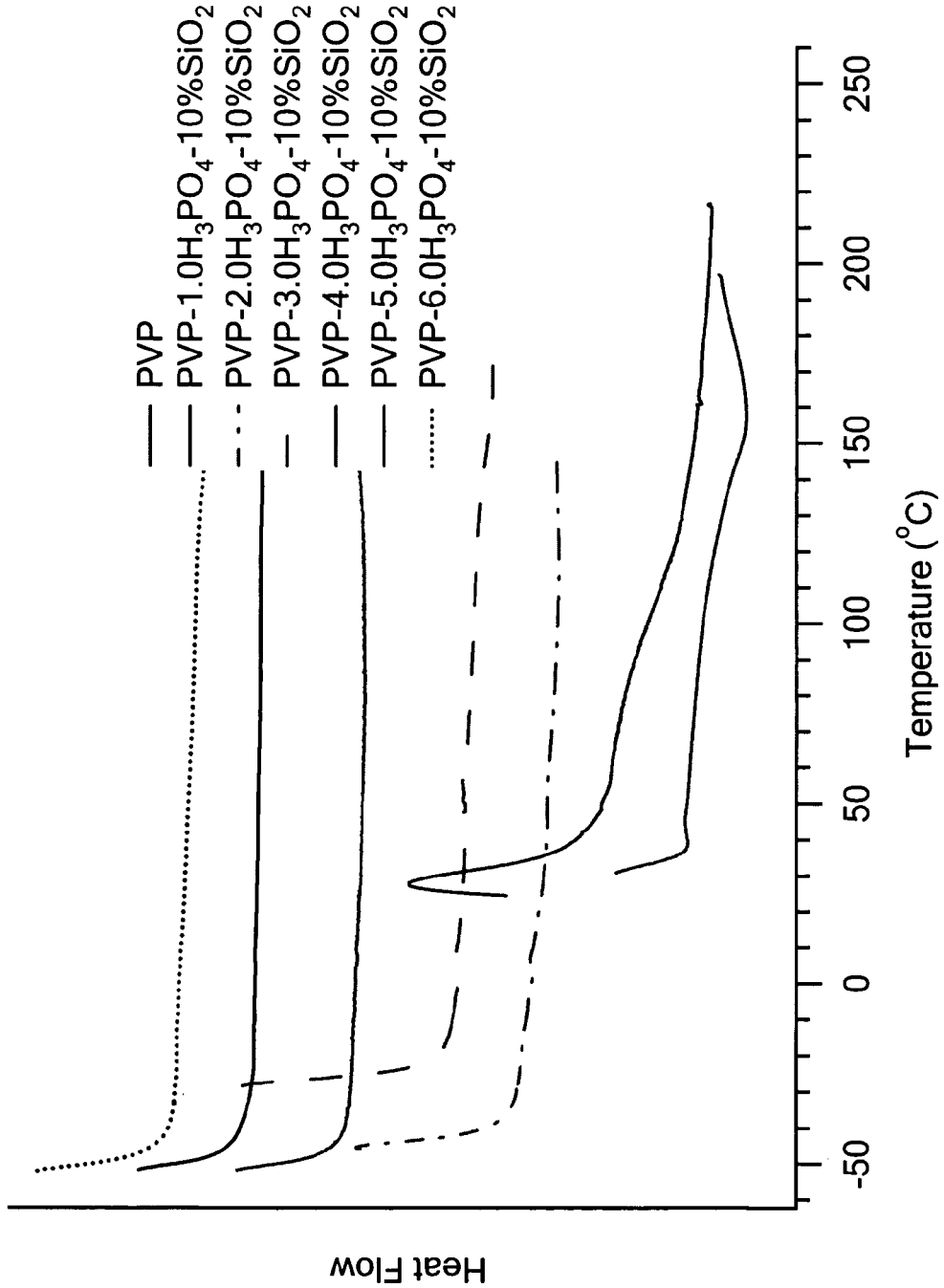
FIG. 7 shows DSC traces (heat flow versus temperature) of PVP and various subject hybrid membranes.

The DSC traces of PVP and some hybrids are shown in FIG. 7. The glass transition temperature ($T_g$) of PVP is 145° C. as determined from the measurement. With the addition of $H_3PO_4$, $T_g$ of the hybrids was blue shifted due to plasticization effect of phosphoric acid to the hybrid [10]. $T_g$ of hybrids with acid content of x=1.0, 2.0, 3.0, 4.0, 5.0, 6.0 is 104° C., −16° C., NA, −38° C., −32° C., −32° C., respectively. However, $T_g$ of x>=3.0 is so close to the cooling limit of the DSC instrument (about −55° C.) that the data obtained was susceptible.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A proton conducting membrane (PCM) comprising a host polymer, a filler oxide, and a proton-source with a $pK_a$ less than about 5, wherein a molar ratio of proton-source anion to a polymer repeat unit in said host polymer is greater than about 1.

2. A PCM according to claim 1, wherein said host polymer contains proton accepting sites selected from group consisting of a nitrogen atom and a carboxyl group.

3. A PCM according to claim 1, wherein said host polymer is selected from a group consisting of poly(vinyl pyrrolidone) (PVP), polyethyleneimine (PEI), poly(4-vinyl pyridine) (P4VP), poly(imides), poly(benzimidazole), poly(vinylimidazole), poly(imino[methylphosphinylidene]iminomethylene-1,3-phenylenemethylene), and poly(amides).

4. A PCM according to claim 1, wherein said host polymer is poly(vinyl pyrrolidone) (PVP).

5. A PCM according to claim 1, wherein said filler oxide is selected from a group consisting of metal oxides.

6. A PCM according to claim 1, wherein said filler oxide is selected from a group consisting of $SiO_2$, $Al_2O_3$, and $TiO_2$.

7. A PCM according to claim 1, wherein said filler oxide is $SiO_2$.

8. A PCM according to claim 1, wherein said filler oxide is $SiO_2$ and is less than or equal to about 50% weight percentage of the PCM.

9. A PCM according to claim 1, wherein said proton-source is selected from a group consisting of $H_3PO_4$, $H_3PO_3$, $H_2SO_4$, $CF_3SO_3H$, HPA, and imides.

10. A PCM according to claim 1, wherein said proton-source is selected from a group consisting of $H_3PO_4$, $H_3PO_3$, $H_2SO_4$, $CF_3SO_3H$, HPA, and imides and said proton-source molar ratio for said proton-source anion to said polymer repeat unit in said host polymer is between greater than about 1 and about $\leq 10$.

11. A PCM according to claim 1, wherein said proton-source is phosphoric acid.

12. A PCM according to claim 1, wherein said proton-source is phosphoric acid and is between greater than about 1 and about 10 as the molar ratio of acid anion to a polymer repeat unit in said host polymer.

13. A proton conducting membrane (PCM) comprising a host polymer-x-acid-y-oxide, wherein x is between greater than about 1 and about 10, with "x" as the molar ratio of acid anion to a polymer repeat unit in said host polymer, and y≦about 50%, with "y" the weight percentage of oxide in the PCM.

14. A PCM according to claim 13, wherein said host polymer contains proton accepting sites selected from group consisting of a nitrogen atom and a carboxyl group.

15. A PCM according to claim 13, wherein said host polymer is selected from a group consisting of poly(vinyl pyrrolidone) (PVP), polyethyleneimine (PEI), poly(4-vinyl pyridine) (P4VP), poly(imides), poly(benzimidazole), poly(vinylimidazole), poly(imino[methylphosphinylidene]iminomethylene-1,3-phenylenemethylene), and poly(amides).

16. A PCM according to claim 13, wherein said host polymer is poly(vinyl pyrrolidone) (PVP).

17. A PCM according to claim 13, wherein said oxide is selected from a group consisting of metal oxides.

18. A PCM according to claim 13, wherein said oxide is selected from a group consisting of $SiO_2$, $Al_2O_3$, and $TiO_2$.

19. A PCM according to claim 13, wherein said oxide is $SiO_2$.

20. A PCM according to claim 13, wherein said acid is selected from a group consisting of $H_3PO_4$, $H_3PO_3$, $H_2SO_4$, $CF_3SO_3H$, HPA, and imides.

21. A PCM according to claim 13, wherein said acid is phosphoric acid.

22. A proton conducting membrane (PCM) comprising a polymer-x-$H_3PO_4$-y-$SiO_2$, wherein x is between greater than about 1 and about 10, with "x" as the molar ratio of $PO_4^{3-}$ to a polymer repeat unit in said polymer, and y≦about 50%, with "y" the weight percentage of $SiO_2$ in the PCM.

23. A PCM according to claim 22, wherein said polymer contains proton accepting sites selected from group consisting of a nitrogen atom and a carboxyl group.

24. A PCM according to claim 22, wherein said polymer is selected from a group consisting of poly(vinyl pyrrolidone) (PVP), polyethyleneimine (PEI), poly(4-vinyl pyridine) (P4VP), poly(imides), poly(benzimidazole), poly(vinylimidazole), poly(imino[methylphosphinylidene]iminomethylene-1,3-phenylenemethylene), and poly(amides).

25. A PCM according to claim 22, wherein said polymer is poly(vinyl pyrrolidone) (PVP).

26. A proton conducting membrane (PCM) comprising poly(vinyl pyrrolidone) (PVP)-x-$H_3PO_4$-y-$SiO_2$, wherein x is between greater than about 1 and about 10, with "x" as the molar ratio of $PO_4^{3-}$ to a repeat unit in said PVP, and y≦about 50%, with "y" the weight percentage of $SiO_2$ in the PCM.

27. A proton conducting membrane (PCM) comprising a host polymer-x-acid-y-oxide, wherein x is between greater than about 1 and about 8, with "x" as the molar ratio of acid anion to a polymer repeat unit in said host polymer, and y≦about 30%, with "y" the weight percentage of oxide in the PCM.

* * * * *